US007159210B2

(12) United States Patent
Griffin et al.

(10) Patent No.: US 7,159,210 B2
(45) Date of Patent: Jan. 2, 2007

(54) PERFORMING SECURE AND INSECURE COMPUTING OPERATIONS IN A COMPARTMENTED OPERATING SYSTEM

(75) Inventors: Jonathan Griffin, Bishopston (GB); Christopher I. Dalton, Redland (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 520 days.

(21) Appl. No.: 10/175,553

(22) Filed: Jun. 18, 2002

(65) Prior Publication Data

US 2002/0194241 A1 Dec. 19, 2002

(30) Foreign Application Priority Data

Jun. 19, 2001 (GB) ................... 0114882.4

(51) Int. Cl.
*G04F 9/45* (2006.01)
*G04F 9/48* (2006.01)
*G04F 12/00* (2006.01)
*G04F 9/455* (2006.01)

(52) U.S. Cl. ............................ 717/141; 711/152; 718/1

(58) Field of Classification Search ................ 717/140, 717/141, 120; 713/200, 168, 164, 167; 711/152, 153; 718/1
See application file for complete search history.

(56) References Cited

U.S. PATENT DOCUMENTS

| 4,799,156 | A | 1/1989 | Shavit et al. ................. 705/26 |
|---|---|---|---|
| 4,926,476 | A | 5/1990 | Covey ......................... 713/164 |
| 5,029,206 | A | 7/1991 | Marino et al. ............... 713/164 |
| 5,032,979 | A | 7/1991 | Hecht et al. ................. 364/200 |
| 5,038,281 | A | 8/1991 | Peters ......................... 364/200 |
| 5,144,660 | A | 9/1992 | Rose .............................. 380/4 |
| 5,359,659 | A | 10/1994 | Rosenthal ....................... 380/4 |
| 5,361,359 | A | 11/1994 | Tajalli et al. ................ 395/700 |
| 5,404,532 | A | 4/1995 | Allen et al. .................. 395/700 |
| 5,421,006 | A | 5/1995 | Jablon et al. ................ 395/575 |
| 5,440,723 | A | 8/1995 | Arnold et al. ............... 395/181 |
| 5,444,850 | A | 8/1995 | Chang ...................... 395/200.1 |
| 5,473,692 | A | 12/1995 | Davis .......................... 380/25 |
| 5,504,814 | A | 4/1996 | Miyahara .................... 713/164 |
| 5,530,758 | A | 6/1996 | Marino et al. .............. 713/150 |
| 5,572,590 | A | 11/1996 | Chess ............................ 380/4 |
| 5,619,571 | A | 4/1997 | Sandstrom et al. ............ 380/4 |

(Continued)

FOREIGN PATENT DOCUMENTS

CA    2 187 855 A    6/1997

(Continued)

OTHER PUBLICATIONS

Barkley, John; Cinotta, Anthony; Managing Role/Permission Relationships Using Object Access Types, p. 73-80, Jul. 1998 ACM, retrieved Jun. 25, 2005.*

(Continued)

*Primary Examiner*—Mary Steelman
(74) *Attorney, Agent, or Firm*—Ladas & Parry LLP

(57) ABSTRACT

A process 23 runs directly on a host operating system 22, until the process 23 attempts an operation which can affect security of the host operating system 22 (such as loading a kernel module or using system privileges). A guest operating system 25 is then provided running as a virtual machine session within a compartment 24 of the host operating system 22 and running of the process 23 continues using the guest operating system. Operations of the process 23 which can affect security of the host operating system 22 are instead performed on the guest operating system 25, giving greater security. The guest operating system 25 is only invoked selectively, leading to greater overall efficiency.

14 Claims, 3 Drawing Sheets

U.S. PATENT DOCUMENTS

| | | | |
|---|---|---|---|
| 5,680,547 A | 10/1997 | Chang | 395/200.01 |
| 5,692,124 A | 11/1997 | Holden et al. | 726/2 |
| 5,694,590 A | 12/1997 | Thuraisingham et al. | 395/600 |
| 5,787,175 A | 7/1998 | Carter | 713/165 |
| 5,809,145 A | 9/1998 | Slik et al. | 380/25 |
| 5,815,665 A | 9/1998 | Teper et al. | 395/200.59 |
| 5,841,869 A | 11/1998 | Merkling et al. | 713/164 |
| 5,844,986 A | 12/1998 | Davis | 380/4 |
| 5,845,068 A | 12/1998 | Winiger | 726/3 |
| 5,867,646 A | 2/1999 | Benson et al. | 395/186 |
| 5,889,989 A | 3/1999 | Robertazzi et al. | 718/105 |
| 5,903,732 A | 5/1999 | Reed et al. | 395/200.59 |
| 5,917,360 A | 6/1999 | Yasutake | 327/387 |
| 5,922,074 A | 7/1999 | Richard et al. | 726/21 |
| 5,933,498 A | 8/1999 | Schneck et al. | 705/504 |
| 5,960,177 A | 9/1999 | Tanno | 395/200.59 |
| 5,987,608 A | 11/1999 | Roskind | 713/200 |
| 6,006,332 A | 12/1999 | Rabne et al. | 713/201 |
| 6,012,080 A * | 1/2000 | Ozden et al. | 718/102 |
| 6,023,765 A | 2/2000 | Kuhn | 713/200 |
| 6,067,559 A | 5/2000 | Allard et al. | 709/202 |
| 6,078,948 A | 6/2000 | Podgorny et al. | 709/204 |
| 6,081,830 A | 6/2000 | Schindler | 709/204 |
| 6,081,894 A | 6/2000 | Mann | 713/188 |
| 6,100,738 A | 8/2000 | Illegems | 327/165 |
| 6,125,114 A | 9/2000 | Blanc et al. | 370/389 |
| 6,138,239 A | 10/2000 | Veil | 713/200 |
| 6,211,583 B1 | 4/2001 | Humphreys | 307/131 |
| 6,272,631 B1 | 8/2001 | Thomlinson et al. | 713/155 |
| 6,275,848 B1 | 8/2001 | Arnold | 709/206 |
| 6,289,462 B1 | 9/2001 | McNabb et al. | 713/201 |
| 6,292,900 B1 | 9/2001 | Ngo et al. | 713/200 |
| 6,327,652 B1 | 12/2001 | England et al. | 713/2 |
| 6,330,670 B1 * | 12/2001 | England et al. | 713/2 |
| 6,334,118 B1 | 12/2001 | Benson | 713/167 |
| 6,367,012 B1 * | 4/2002 | Atkinson et al. | 713/176 |
| 6,393,412 B1 | 5/2002 | Deep | 705/400 |
| 6,477,702 B1 | 11/2002 | Yellin et al. | 717/126 |
| 6,505,300 B1 | 1/2003 | Chan et al. | 713/164 |
| 6,513,156 B1 * | 1/2003 | Bak et al. | 717/151 |
| 6,609,248 B1 * | 8/2003 | Srivastava et al. | 717/147 |
| 6,671,716 B1 | 12/2003 | Diedrechsen et al. | 709/203 |
| 6,681,304 B1 | 1/2004 | Vogt et al. | 711/164 |
| 6,732,276 B1 * | 5/2004 | Cofler et al. | 713/200 |
| 6,751,680 B1 | 6/2004 | Langerman et al. | 710/3 |
| 6,757,824 B1 | 6/2004 | England | 713/156 |
| 6,757,830 B1 | 6/2004 | Tarbotton et al. | 713/188 |
| 6,775,779 B1 * | 8/2004 | England et al. | 713/200 |
| 6,892,307 B1 | 5/2005 | Wood et al. | 726/8 |
| 6,931,545 B1 | 8/2005 | Ta et al. | 713/156 |
| 6,948,069 B1 | 9/2005 | Teppler | 713/178 |
| 6,965,816 B1 | 11/2005 | Walker | 701/16 |
| 2001/0037450 A1 * | 11/2001 | Metlitski et al. | 713/152 |
| 2002/0012432 A1 | 1/2002 | England et al. | 380/231 |
| 2002/0023212 A1 | 2/2002 | Proudler | 713/164 |
| 2002/0042874 A1 | 4/2002 | Arora | 712/229 |
| 2002/0069354 A1 | 6/2002 | Fallon et al. | 713/2 |
| 2002/0184486 A1 | 12/2002 | Kerschenbaum et al. | 713/150 |
| 2002/0184520 A1 | 12/2002 | Bush et al. | 713/200 |
| 2003/0009685 A1 | 1/2003 | Choo et al. | 713/200 |
| 2003/0014466 A1 | 1/2003 | Berger et al. | 709/102 |
| 2004/0045019 A1 | 3/2004 | Bracha et al. | 719/332 |
| 2004/0073617 A1 | 4/2004 | Milliken et al. | 709/206 |
| 2004/0148514 A1 | 7/2004 | Fee et al. | 713/200 |
| 2005/0256799 A1 | 11/2005 | Warsaw et al. | 705/37 |

FOREIGN PATENT DOCUMENTS

| | | |
|---|---|---|
| EP | 0 421 409 A2 | 4/1991 |
| EP | 0 510 244 A1 | 10/1992 |
| EP | 0 580 350 A1 | 1/1994 |
| EP | 0 825 511 A | 2/1998 |
| EP | 0 849 657 A | 6/1998 |
| EP | 0 849 680 A2 | 6/1998 |
| EP | 0 465 016 | 12/1998 |
| EP | 0 893 751 A1 | 1/1999 |
| EP | 0 895 148 A | 2/1999 |
| EP | 0 926 605 A1 | 6/1999 |
| EP | 0 992 958 A2 | 4/2000 |
| EP | 1 030 237 A1 | 8/2000 |
| EP | 1 049 036 A2 | 11/2000 |
| EP | 1 055 990 A1 | 11/2000 |
| EP | 1 056 010 A1 | 11/2000 |
| EP | 1 076 279 A1 | 2/2001 |
| EP | 1 107 137 A2 | 6/2001 |
| GB | 2 317 476 A | 3/1998 |
| GB | 2 336 918 A | 11/1999 |
| GB | 0020441.2 | 8/2000 |
| GB | 2 353 885 A1 | 3/2001 |
| GB | 2 361 153 A | 10/2001 |
| WO | 93/25024 A | 12/1993 |
| WO | 94/11967 A1 | 5/1994 |
| WO | 95/24696 A | 9/1995 |
| WO | 95/27249 A | 10/1995 |
| WO | 97/29416 A2 | 8/1997 |
| WO | 98/15082 A | 4/1998 |
| WO | 98/26529 | 6/1998 |
| WO | 98/36517 A | 8/1998 |
| WO | 98/40809 A2 | 9/1998 |
| WO | 98/44402 | 10/1998 |
| WO | 98/45778 A | 10/1998 |
| WO | 00/19324 A1 | 4/2000 |
| WO | 00/31644 | 6/2000 |
| WO | 00/48062 | 8/2000 |
| WO | 00/48063 | 8/2000 |
| WO | 00/52900 A1 | 9/2000 |
| WO | 00/54125 | 9/2000 |
| WO | 00/54126 | 9/2000 |
| WO | 00/58859 | 10/2000 |
| WO | 00/73880 A1 | 12/2000 |
| WO | 00/73904 A1 | 12/2000 |
| WO | 00/73913 A1 | 12/2000 |
| WO | 01/09781 A2 | 2/2001 |
| WO | 01/13198 | 2/2001 |
| WO | 01/23980 A1 | 4/2001 |
| WO | 01/27722 A1 | 4/2001 |
| WO | 01/65334 A2 | 9/2001 |
| WO | 01/65366 A1 | 9/2001 |

OTHER PUBLICATIONS

Grimm, Robert; Bershad, Brian N; "Separating Access Control Policy, Enforcement, and Functionality in Extensible Systems", p. 36-70, Feb. 2001, ACM, retrieved Jun. 25, 2005.*

Jaeger, Trent; Prakash, Atul; "Requirements of Role-Based Access Control for Collaborative Systems", p. 53-64, Dec. 1996, ACM, retrieved Jun. 25, 2005.*

Zhang, X. Nick; "Secure Code Distribution", p. 76-79, IEEE, retrieved Jun. 25, 2005.*

Anderson, R., et al., "Tamper Resistance—a Cautionary Note," *ISENIX Association, Second USENIX Workshop on Electronic Commerce*, pp. 1-11 (Nov. 18-21, 1996).

Berger, J.L., et al., "Compartmented Mode Workstation: Prototype Highlights," *IEEE Transactions on Software Engineering*, vol. 16, No. 6 (Jun. 1990).

Chaum, D., "Security without Identification: Transaction Systems to Make Big Brother Obsolete," *Communications of the ACM*, vol. 28, No. 10, pp. 1030-1044 (Oct. 1985).

Choo, T.H., et al., "Trusted Linux: A Secure Platform for Hosting Compartmented Applications," *Enterprise Solutions*, pp. 1-14 (Nov./Dec. 2001).

Dalton, C., et al., "An operating system approach to securing e-services," *Communications of the ACM*, vol. 44, Issue 2 (Feb. 2001).

Dalton, C., et al., "Applying Military Grade Security to the Internet," *Computer Networks and ISND Systems*, vol. 29, pp. 1799-1808 (1997).
Dalton, C.I., et al., "Design of secure UNIX," Elsevier Information Security Report, (Feb. 1992).
Hallyn, S.E., et al., "Domain and Type Enforcement for Linux," Internet: <http://www.usenix.org/publications/library/proceedings/als2000/full_papers/hallyn/hallyn_html/>. (Retrieved Apr. 24, 2002).
Loscocco, P., et al., "Integrating Flexible Support for Security Policies into the Linux Operating System," Internet: <www.nsa.gov/selinux> (Retrieved Apr. 24, 2002).
Milojicic, D., et al., "Process Migration," Internet: <http://www.hpl.hp.com/techreports/1999/HPL-1999-21.html.> pp. 1-48 (Dec. 5, 1998).
Scheibe, M., "TCPA Security: Trust your Platform!" *Quarterly Focus PC Security*, pp. 44-47. Internet: <http://www.silicon-trust.com/pdf/secure_PDF/Seite_44-47.pdf>.
Senie, D., "Using the SOCK_PACKET mechanism in Linux to gain complete control of an Ethernet Interface," Internet: <http://www.senie.com/dan/technology/sock_packet.html>. (Retrieved Apr. 24, 2002).
Wiseman, S., et al., "The Trusted Path between SMITE and the User," *Proceedings 1988 IEEE Symposium on Security and Privacy*, pp. 147-155 (Apr. 18-21, 1988).
Yee, B., "Using Secure Coprocessors," Doctoral thesis—Carnegie Mellon University, pp. 1-94 (May 1994).
*Boot Integrity Services Application Programming Interface*, Version 1.0, Intel Corporation, pp. 1-60 (Dec. 28, 1998).
"Building a Foundation of Trust in the PC," *Trusted Computing Platform Alliance*, pp. 1-7 (Jan. 2000).
"HP Virtualvault: Trusted Web-server Platfrom Product Brief," Internet: <http://www.hp.com/security/products/virtualvault/papers/brief_4.0/> pp. 1-6.
"Information technology—Security techniques—Entity authentication; Part 3: Mechanisms using digital signature techniques," *ISO/IEC 9798-3*, Second Edition, pp. 1-6 (1998).
"Information technology—Security techniques—Key management—Part 3: Mechanisms using asymmetric techniques," *ISO/IEC 11770-3*, pp. 1-34 (1999).
"NIST Announces Technical Correction to Secure Hash Standard," Internet: <http://www.nist.gov/public_affairs/releases/hashstan.htm> pp. 1-2 (Oct. 24, 2002).
"Norton AntiVirus 5.0 Delux," *PC Magazine Online; The 1999 Utility Guide: Desktop Antivirus*, pp. 1-2, Internet: <http://wwww.zdnet.com/pcmag/features/utilities99/deskav07.html> (Retrieved Nov. 30, 2001).
"Secure Computing with JAVA™: Now and the Future," Internet <http://java.sun.com/marketing/collateral/security.html> pp. 1-29 (Apr. 2, 2002).
"Secure Execution Environments, Internet Safety through Type-Enforcing Firewalls," Internet: <thp://www.ghp.com/research/nailabs/secure-execution/internet-safety.asp> (Retrieved Apr. 24, 2002).
*Sophos Anti-Virus for Notes/Domino Release Notes*, Version 2.0, pp. 1-2, Internet: <http://www.sophos.com/sophos/products/full/readmes/readnote.txt> (Retrieved Nov. 30, 2001).
*Trusted Computing Platform Alliance (TCPA), Main Specification*, Version 1.0, pp. 1-284 (2000).
*Trusted Computing Platform Alliance (TCPA), TCPA Design Philosophies and Concepts*, Version 1.0, Internet: <www.trustedpc.org> pp. 1-30 (Jan. 2001).
U.S. Appl. No. 09/728,827, filed Nov. 28, 2000, Proudler et al.
U.S. Appl. No. 09/920,554, filed Aug. 1, 2001, Proudler.
U.S. Appl. No. 10/075,444, filed Feb. 15, 2002, Brown et al.
U.S. Appl. No. 10/080,446, filed Feb. 22, ;2002, Pearson et al.
U.S. Appl. No. 10/165,840, filed Jun. 7, 2002, Dalton.
U.S. Appl. No. 10/175,183, filed Jun. 18, 2002, Griffin et al.
U.S. Appl. No. 10/175,185, filed Jun. 18, 2002, Pearson et al.
U.S. Appl. No. 10/175,395, filed Jun. 18, 2002, Pearson et al.
U.S. Appl. No. 10/175,542, filed Jun. 18, 2002, Griffin et al.
U.S. Appl. No. 10/206,812, filed Jul. 26, 2002, Proudler.
U.S. Appl. No. 10/240,137, filed Sep. 26, 2002, Dalton et al.
U.S. Appl. No. 10/240,139, filed Sep. 26, 2002, Choo et al.
U.S. Appl. No. 10/303,690, filed Nov. 21, 2002, Proudler et al.
Burke, J.P., "Security Suite Gives Sniffer Programs Hay Fever," *HP Professional*, vol. 8, No. 9, 3 pages total (Sep. 1994).
U.S. Appl. No. 09/979,902, filed Nov. 27, 2002, Proudler et al.
U.S. Appl. No. 09/979,903, filed Nov. 27, 2001, Proudler et al.
U.S. Appl. No. 10/080,476, filed Feb. 22, 2002, Proudler et al.
U.S. Appl. No. 10/080,477, filed Feb. 22, 2002, Brown et al.
U.S. Appl. No. 10/080,478, filed Feb. 22, 2002, Pearson et al.
U.S. Appl. No. 10/080,479, filed Feb. 22, 2002, Pearson et al.
U.S. Appl. No. 10/194,831, filed Jul. 11, 2002, Chen et al.
U.S. Appl. No. 10/208,718, filed Jul. 29, 2002, Chen et al.
U.S. Appl. No. 10/240,138, filed Sep. 26, 2002, Choo.
Bontchev, V., "Possible Virus Attacks Against Integrity Programs and How to Prevent Them," Virus Bulletin Conference, pp. 131-141 (Sep. 1992).
Naor, M., et al., "Science and Efficient Metering," Internet: <http://citeseer.nj.com/naor98secure.html> Sections 1-1.3 (1998).
P.C. Magazine Online; The 1999 Utility Guide: Desktop Antivirus; Norton Antivirus 5.0 DeLux, Internet.
Radai, Y., "Checksumming Techniques for Anti-Viral Purposes," Virus Bulletin Conference, pp. 39-68 (Sep. 1991).
Schneck, P.B., "Persistent Access Control to Prevent Piracy of Digital Information," *Proceedings of the IEEE*, vol. 87, No. 7, pp. 1239-1250 (Jul. 1999).
"System for Detecting Undesired Alteration of Software," IBM Technical Bulletin, vol. 32, No. 11 pp. 48-50 (Apr. 1990).
The Trusted Computing Platform Alliance, "Building Foundation of Trust in the PC,", 9 pages, located at Internet address <www.trustedpc.org/home/home.html.> (Jan. 2000).
Ford, B., et al., "Microkernels Meet Recursive Virtual Machines", Operating Systems Review, ACM, vol. 30, No. Special Issue, pp. 137-151 (Dec. 21, 1996).
Goldberg, R.P., "Survey of Virtual Machine Research", Computer, IEEE Service Center, vol. 7, No. 6, pp. 34-35 (Jun. 1974).
Popek, G. J., "Formal Requirements for Virtualizable Third Generation Architectures", Communications of the Association for Computing Machinery, ACM, vol. 17, No. 7, pp. 412-421 (Jul. 1974).

* cited by examiner

PERFORMING SECURE AND INSECURE COMPUTING OPERATIONS IN A COMPARTMENTED OPERATING SYSTEM

CROSS REFERENCE TO RELATED APPLICATIONS

The subject matter of the present application may also be related to the following U.S. Patent Applications: "Operation of Trusted State in Computing," Ser. No. 09/728,827, filed Nov. 28, 2000; "Performance of a Service on a Computing Platform," Ser. No. 09/920,554, filed Aug. 1, 2001; "Secure E-mail Handling Using a Compartmented Operating System," Ser. No. 10/075,444, filed Feb. 15, 2002; "Electronic Communication," Ser. No. 10/080,466, filed Feb. 22, 2002; "Demonstrating Integrity of a Compartment of a Compartmented Operating System," Ser. No. 10/165,840, filed Jun. 7, 2002; "Multiple Trusted Computing Environments with Verifiable Environment Entities," Ser. No. 10/175,183, filed Jun. 18, 2002; "Renting a Computing Environment on a Trusted Computing Platform," Ser. No. 10/175,185, filed Jun. 18, 2002; "Interaction with Electronic Services and Markets," Ser. No. 10/175,395, filed Jun. 18, 2002; "Multiple Trusted Computing Environments," Ser. No. 10/175,542, filed Jun. 18, 2002; "Privacy of Data on a Computer Platform," Ser. No. 10/206,812, filed Jul. 26, 2002; "Trusted Operating System," Ser. No. 10/240,137, filed Sept. 26, 2002; "Trusted Gateway System," Ser. No. 10/240,139, filed Sep. 26, 2002; and "Apparatus and Method for Creating a Trusted Environment," Ser. No. 10/303,690, filed Nov. 21, 2002.

The present invention relates to a method for running a process, and to a computing platform for performing the method.

A computing platform operates under the control of a host operating system. A process runs on the host operating system to perform computing operations. However, the host operating system is vulnerable to subversion by the process, both through a deliberate attack or inadvertently due to errors in the process. The process performs operations, some of which can be trusted to run securely on the host operating system, and some of which are insecure and cannot be trusted.

In practical situations, many processes run on the computing platform simultaneously, such that subversion of the host operating system by one process can potentially affect many others. It is therefore desired to increase security for the computing platform and provide a measure of isolation between the process and the host operating system.

It is known to provide a virtual machine to run on the host operating system. The virtual machine usually includes a guest operating system. The guest operating system commonly is a replica of a second type of operating system such that the computing platform using the host operating system can run processes which are native to the second operating system. The process runs on the guest operating system, and is isolated from the host operating system by the virtual machine. Whilst reasonably secure due to this level of isolation, a virtual machine has a high degree of overhead. In a practical computing environment, it is very inefficient to run a large number of processes on a guest operating system.

An aim of the present invention is to provide a method for running a process performing both secure and insecure operations. One preferred aim is to run a process safely, ideally with a low risk of subversion of a host operating system. Also, a preferred aim is to provide a method that allows a guest operating system to be used efficiently and effectively. Another aim of the present invention is to provide a computing platform for performing the method.

According to a first aspect of the present invention there is provided a method for running a process, comprising the steps of: (a) providing a host operating system; (b) running a process directly on the host operating system; (c) selectively providing a guest operating system when the process attempts a predetermined operation; and (d) running the process on the guest operating system.

Preferably, in the step (b) the process runs within a compartment of the host operating system.

Preferably, in the step (c) operations attempted by the process are divided into a first set which are allowed to run directly on the host operating system and a second set which are not allowed to run directly on the host operating system. Preferably, the step (c) comprises identifying an attempt to perform an operation falling into the second set. Preferably, in the step (c) the guest operating system is provided within a compartment of the host operating system. Preferably, the guest operating system is provided by a virtual machine session.

Optionally, the method comprises the step of closing the guest operating system in response to a condition caused by running the process on the guest operating system. Preferably, the guest operating system is provided within a compartment of the host operating system, and the step (e) comprises closing the compartment.

According to a second aspect of the present invention there is provided a method for running a process, comprising the steps of: (a) providing a host operating system; (b) providing a process which attempts an operation; (c) monitoring attempted operations of the process by comparing against a first set and a second set; (d) where the attempted operation falls into the first set, allowing the attempted operation to execute directly on the host operating system; and (e) where the attempted operation falls into the second set, providing a guest operating system, and allowing the attempted operation to execute on the guest operating system.

According to a third aspect of the present invention there is provided a computing platform for running a process, comprising: a host operating system for running a process; and a guest operating system selectively provided for running the process when the process attempts a predetermined operation.

Preferably, the host operating system provides a compartment for containing the process.

Preferably, operations attempted by the process fall either into a first set allowed to run directly on the host operating system or a second set not allowed to run directly on the host operating system. Preferably, the host operating system identifies an attempt to perform an operation falling into the second set, and in response provides the guest operating system. Preferably, the host operating system provides a compartment for containing the guest operating system. Preferably, the guest operating system is provided by a virtual machine session running on the host operating system.

For a better understanding of the invention, and to show how embodiments of the same may be carried into effect, reference will now be made, by way of example, to the accompanying diagrammatic drawings in which.

Figure 1:
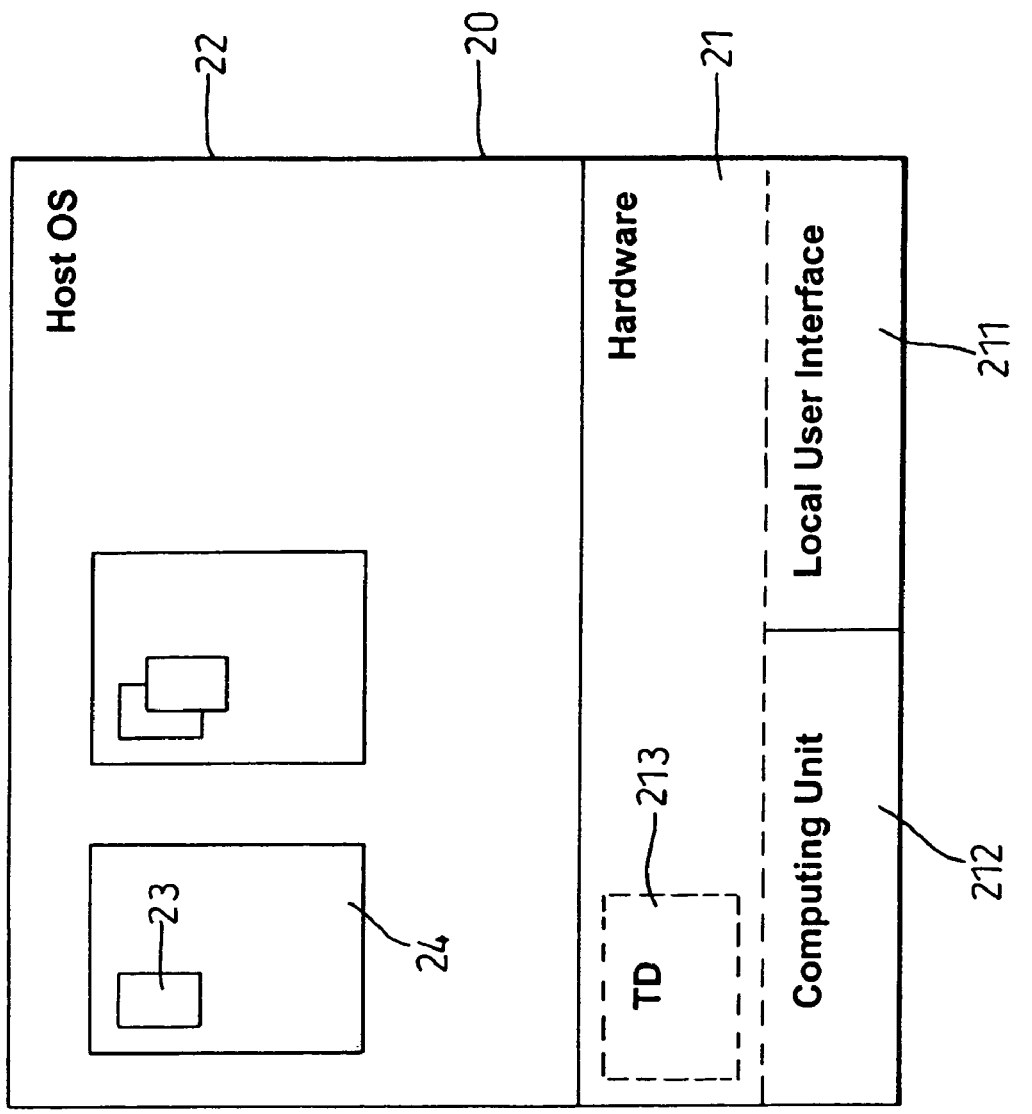
FIG. 1 shows a preferred computing platform in a first example configuration.
Figure 2:
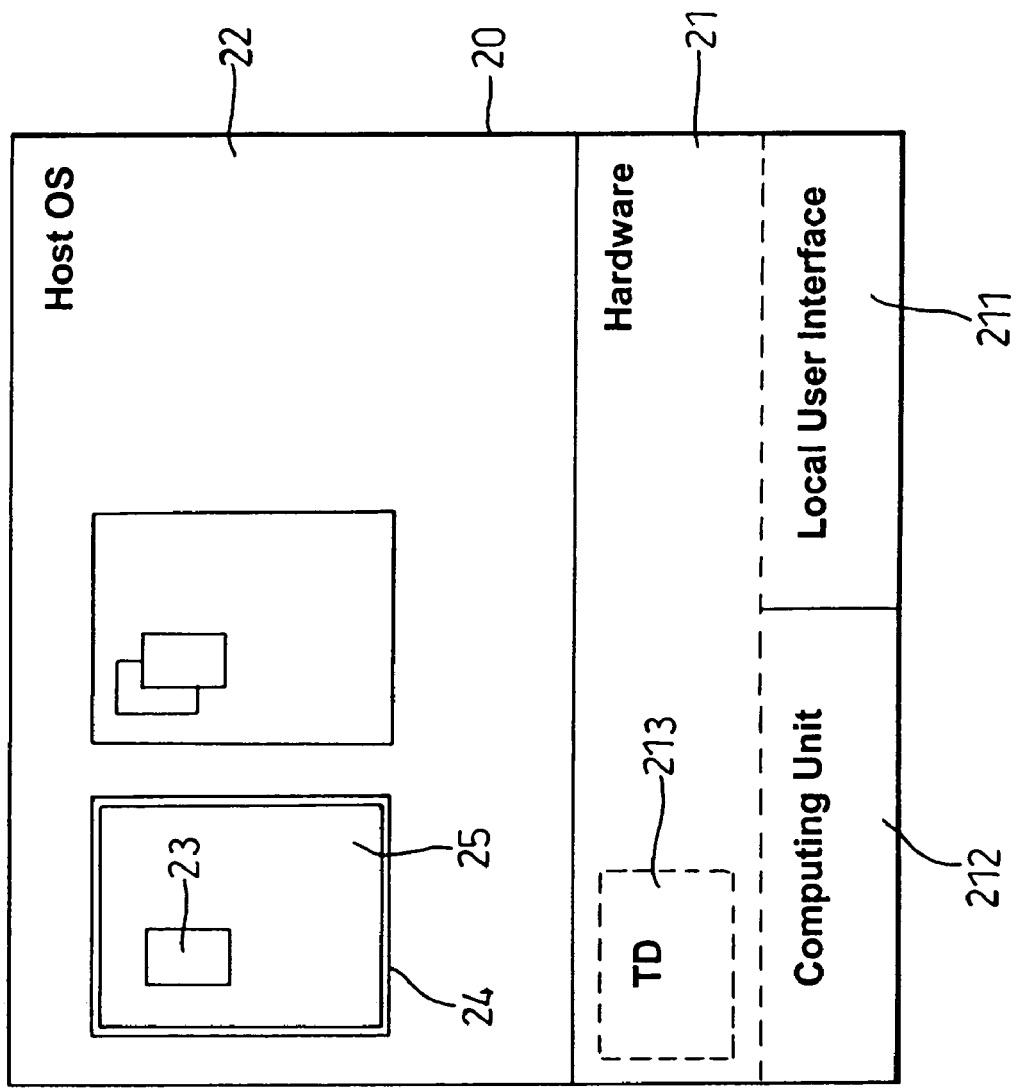
FIG. 2 shows the preferred computing platform in a second example configuration.

FIGS. 1 and 2 show an example computing platform 20 employed in preferred embodiments of the present invention. The computing platform 20 comprises hardware 21 operating under the control of a host operating system 22. The hardware 21 may include standard features such as a keyboard, a mouse and a visual display unit which provide a physical user interface 211 to a local user of the computing platform. The hardware 21 also suitably comprises a computing unit 212 including a main processor, a main memory, an input/output device and a file storage device which together allow the performance of computing operations. Other parts of the computing platform are not shown, such as connections to a local or global network. This is merely one example form of computing platform and many other specific forms of hardware are applicable to the present invention.

In the preferred embodiment the hardware 21 includes a trusted device 213. The trusted device 213 functions to bind the identity of the computing platform 20 to reliably measured data that provides an integrity metric of the platform and especially of the host operating system 22. WO 00/48063 (Hewlett-Packard) discloses an example trusted computing platform suitable for use in preferred embodiments of the present invention.

Referring to FIG. 1, the host operating system 22 runs a process 23. In practical embodiments, many processes run on the host operating system simultaneously. Some processes are grouped together to form an application or service. For simplicity, a single process will be described first, and the invention can then be applied to many processes and to groups of processes.

In the preferred embodiment, the process 23 runs within a compartment 24 provided by the host operating system 22. The compartment 24 serves to confine the process 23, by placing strict controls on the resources of the computing platform available to the process, and the type of access that the process 23 has to those resources. Controls implemented by a compartment are very difficult to override or subvert from user space by a user or application responsible for running the process 23.

Compartmented operating systems have been available for several years in a form designed for handling and processing classified (military) information, using a containment mechanism enforced by a kernel of the operating system with mandatory access controls. The operating system attaches labels to the resources and enforces a policy which governs the allowed interaction between these resources based on their label values. Most compartmented operating systems apply a policy based on the Bell-LaPadula model discussed in the paper "Applying Military Grade Security to the Internet" by C I Dalton and J F Griffin published in Computer Networks and ISDN Systems 29 (1997) 1799–1808.

The preferred embodiment of the present invention adopts a simple and convenient form of operating system compartment. Each resource of the computing platform which it is desired to protect is given a label indicating the compartment to which that resource belongs. Mandatory access controls are performed by the kernel of the host operating system to ensure that resources from one compartment cannot interfere with resources from another compartment. Access controls can follow relatively simple rules, such as requiring an exact match of the label. Examples of resources include data structures describing individual processes, shared memory segments, semaphores, message queues, sockets, network packets, network interfaces and routing table entries.

Communication between compartments is provided using narrow kernel level controlled interfaces to a transport mechanism such as TCP/UDP. Access to these communication interfaces is governed by rules specified on a compartment by compartment basis. At appropriate points in the kernel, access control checks are performed such as through the use of hooks to a dynamically loadable security module that consults a table of rules indicating which compartments are allowed to access the resources of another compartment. In the absence of a rule explicitly allowing a cross compartment access to take place, an access attempt is denied by the kernel. The rules enforce mandatory segmentation across individual compartments, except for those compartments that have been explicitly allowed to access another compartment's resources. A communication interface from a compartment to a network resource is provided in a similar manner. In the absence of an explicit rule, access from a compartment to a network resource is denied.

Suitably, each compartment is allocated an individual section of a file system of the computing platform. For example, the section is a chroot of the main file system. Processes running within a particular compartment only have access to that section of the file system. Through kernel controls, the process is restricted to the predetermined section of file system and cannot escape. In particular, access to the root of the file system is denied.

Advantageously, a compartment provides a high level of containment, whilst reducing implementation costs and changes required in order to implement an existing application within the compartment.

The process 23 performs a wide variety of different operations most of which pose no threat to the security of the computing platform 20 and can be safely performed directly on the host operating system 22, preferably using the constraints of a compartment 24. However, some predetermined operations can potentially affect the security of the host operating system 22, such as loading a kernel module or using system privileges. If the process 23 is allowed to perform one of these predetermined operations, compromise of the security of the platform 20 can result.

Referring to FIG. 2, the computing platform 20 is shown similar to FIG. 1 except that a guest operating system 25 has been provided for running the process 23. Suitably, the guest operating system 25 runs within the compartment 24 containing the process 23.

Preferably, the guest operating system is provided only when the process 23 attempts to perform one of the predetermined operations that can affect the security of the host operating system 22. That is, whilst the process 23 performs operations falling within a first set the process is allowed to operate directly on the host operating system as shown in FIG. 1. When the process 23 attempts to perform an operation falling within a second set containing the predetermined operations which can affect security of the host operating system, then a guest operating system 25 is provided for running the process 23 as shown in FIG. 2.

Advantageously, the guest operating system 25 is provided only when required to protect the security of the host operating system 22, thereby minimising overhead associated with the guest operating system 22 such that the process 23 runs more efficiently. Should problems occur the host operating system 22 can safely shut down the offending guest operating system 25. In the preferred embodiment the host operating system shuts down the compartment 24 containing the guest operating system 25.

The guest operating system 25 is suitably provided as a virtual machine session. A virtual machine session is an application which provides an image of the computing platform 20, or appropriate parts thereof. The virtual machine session provides a virtual guest operating system, such that, as far as the process 23 is concerned, the process 23 runs on the guest operating system 25 equivalent to running on the host operating system 22. For the purposes of the present invention, the guest operating system is preferably a replica of the host operating system, or at least necessary parts thereof.

An example virtual machine application is sold under the trade mark VMware by VMware, Inc. of Palo Alto, Calif., USA.

Figure 3:
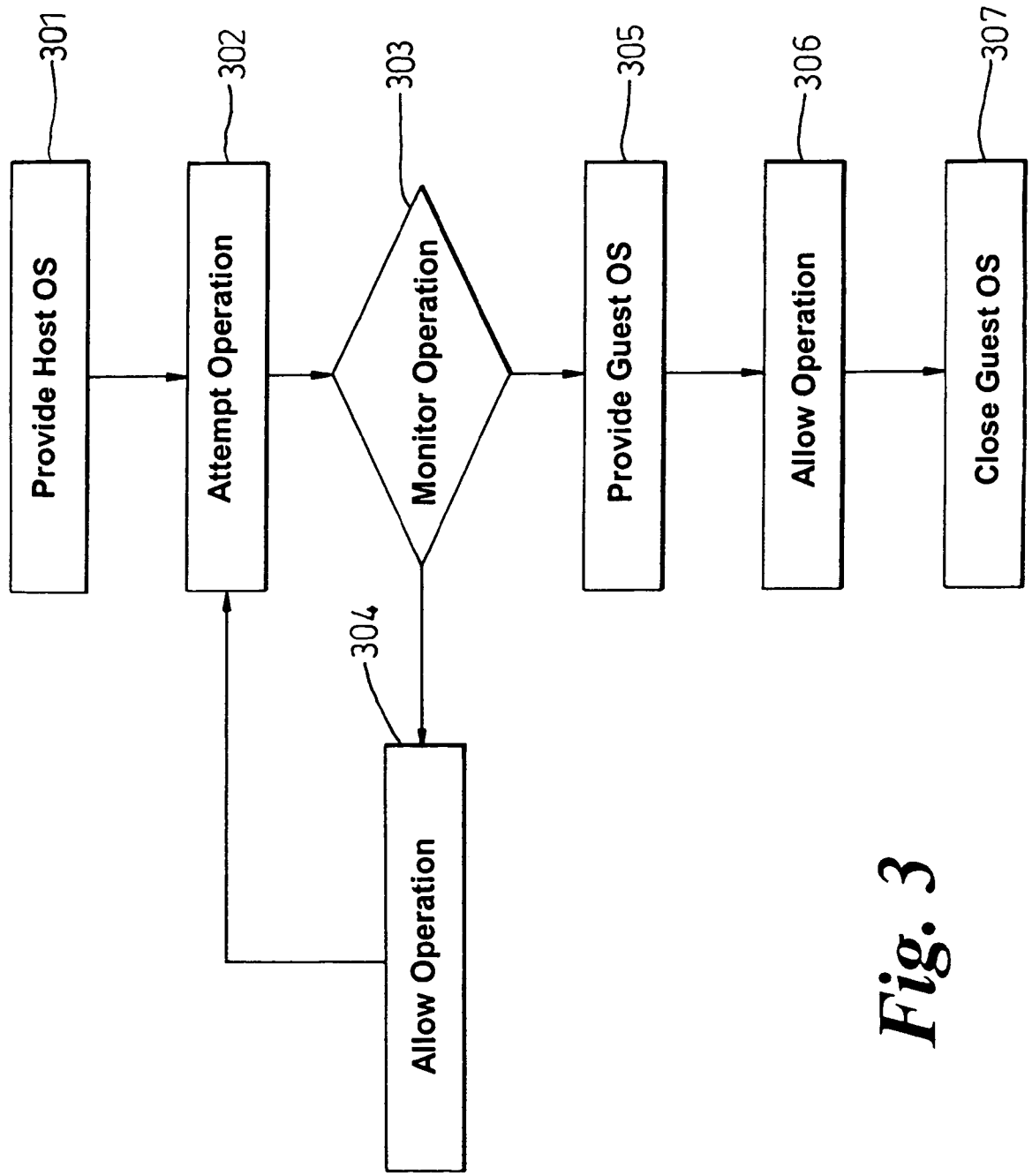
FIG. 3 shows a preferred method for running a process, using the computing platform described with reference to FIGS. 1 and 2.

A preferred method for running a process will now be described with reference to FIG. 3. The process performs operations, some of which can be trusted to run securely on the host operating system, and some of which are insecure and cannot be trusted.

In step 301 a host operating system is provided. Suitably, this is the host operating system 22.

In step 302 a process 23 runs on the host operating system 22 and attempts to perform a first operation. Preferably, the host operating system 22 provides a compartment 24, and the process 23 is contained by the compartment 24.

At step 303 operations attempted by the process are monitored. Preferably, the operation attempted by the process is compared with a list of operations falling into a first set and a second set.

If the attempted operation falls within the first set then the process is determined as one which will not affect security of the host operating system. At step 304 execution of the operation is allowed directly on the host operating system 22. This can be termed a trusted or secure operation. The method returns to step 302 and the next operation is attempted by the process. Processes which consist entirely of operations which fall within the first set are allowed to run entirely direct on the host operating system 22 giving a significant speed advantage.

If the attempted operation falls into the predetermined second set representing operations which can potentially affect security of the host operating system 22, the method proceeds to step 305.

In step 305 a guest operating system 25 is provided. Preferably, the guest operating system 25 is provided within a compartment 24 for confining the guest operating system. Preferably the guest operating system is provided through a virtual machine session. The compartment 24 confines the virtual machine session, and therefore also confines the process 23.

In step 306 the process runs on the guest operating system 25. The attempted operation is executed by the guest operating system 25. The attempted operation, which was previously disallowed because it fell into the predetermined second set, is now allowed because the process is running on the guest operating system 25. The process 23 can only affect the guest operating system, and cannot affect the host operating system 22. The process will now remain running on the guest operating system 25.

Although the guest operating system 25 involves significant additional overhead, the guest operating system is invoked only when the process 23 attempts to perform predetermined operations, which in practice is relatively rarely. Migration of the process 23 from the host operating system to the guest operating system can be performed in any suitable manner and will be familiar to the skilled person.

Optionally, in step 307 the guest operating system 25 is closed by the host operating system 22. Suitably, the guest operating system 25 is closed in response to a condition arising as a result of executing the attempted operation on the quest operating system. That is, where the process attempts an untrusted or insecure operation and a dangerous condition arises, then the guest operating system 25 is closed down. Preferably, the host operating system 22 simply closes the relevant compartment 24 containing the guest operating system 25.

A method and computer platform have been described for running a process selectively either directly on the host operating system or on the guest operating system, depending on operations performed by the process. A good efficiency is achieved whilst maintaining a high level of security.

The invention claimed is:

1. A method for running a process, comprising:
    (a) providing a host operating system;
    (b) running operations of a process directly on the host operating system;
    (c) selectively providing a guest operating system when the process attempts a predetermined operation; and
    (d) running the predetermined operation and remaining operations of the process on the guest operating system, wherein the operations of the process are divided into a first set of operations which are allowed to run directly on the host operating system and a second set of operations which are not allowed to run directly on the host operating system, wherein the predetermined operations fall into the second set of operations and the remaining operations may fall into either the first set of operations or the second set of operations.

2. The method of claim 1, wherein the paragraph (c) comprises identifying an attempt to perform an operation falling into the second set.

3. The method of claim 1, wherein in the paragraph (c) the guest operating system is provided within a compartment of the host operating system.

4. The method of claim 1, wherein in the paragraph (b) the process runs within a compartment of the host operating system.

5. The method of claim 1, wherein the guest operating system is provided by a virtual machine session.

6. The method of claim 1, further comprising (e) closing the guest operating system in response to a condition caused by running the process on the guest operating system.

7. The method of claim 6, wherein the guest operating system is provided within a compartment of the host operating system, and the paragraph (e) comprises closing the compartment.

8. A method for running a process, comprising:
    (a) providing a host operating system;
    (b) providing a process which attempts one or more operations;
    (c) monitoring attempted one or more operations of the process by comparing against a first set of operations and a second set of operations;
    (d) executing the attempted operation directly on the host operating system if it falls into the first set of operations;
    (e) providing a guest operating system and allowing the attempted operation and remaining operations to execute on the guest operating system if the attempted operation falls into the second set of operations, wherein the remaining operations may fall into either the first set of operations or the second set of operations.

9. A computing platform system, comprising:
a memory to store a computer-executable instructions; and
a processor operatively coupled to said memory and configured to implement said computer-executable instructions and configured to:
execute operations of a process on a host operating system; and
execute a predetermined operation and remaining operations of the process when the process attempts the predetermined operation on a guest operating system, wherein the operations of the process are divided into a first set of operation which are allowed to run directly on the host operating system and a second set of operations which are not allowed to run directly on the host operating system, wherein the predetermined operations fall into the second of operations and the remaining operations may fall into either the first set of operations or the second set of operations.

10. The computing platform of claim 9, wherein the host operating system indentifies an attempt to performed an operating falling into the second set, and in response provides the guest operating system.

11. The computing platformed of claim 9, wherein the host operating system provides a compartment for containing the process.

12. The computing platform of claim 9, wherein the host operating system provides a compartment for containing the guest operating system.

13. The computing platform of claim 9, wherein the guest operating system is provided by a virtual machine session running on the host operating system.

14. A method for running a process, comprising:
(a) providing a host operating system;
(b) providing a process which attempts one or more operations;
(c) monitoring attempted one or more operations of the process by comparing against a first set of operations and a second of operations;
(d) executing the attempted one or more operations directly on the host operating system if the one or more operations fall into the first set of operations;
(e) migrating execution of a remainder of the process to a guest operating system if the attempted one or more operations fall into the second set of operations, wherein the remainder of the process may contain either the first set of operations or the second set of operations.

* * * * *